(12) United States Patent
Wenrick

(10) Patent No.: US 12,046,909 B2
(45) Date of Patent: *Jul. 23, 2024

(54) PHOTOVOLTAIC POWER PLANT ENERGY HARVEST OPTIMIZATION—CAPACITY FACTOR, DELTA-P LOSS AND RAMP RATE COMPENSATION

(71) Applicant: Also Energy, Inc., Boulder, CO (US)

(72) Inventor: Zachary M. Wenrick, Longmont, CO (US)

(73) Assignee: Also Energy, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,252

(22) Filed: Apr. 10, 2023

(65) Prior Publication Data

US 2023/0318308 A1 Oct. 5, 2023

Related U.S. Application Data

(63) Continuation of application No. 17/130,970, filed on Dec. 22, 2020, now Pat. No. 11,626,737.

(Continued)

(51) Int. Cl.
*H02J 3/46* (2006.01)
*G05B 15/02* (2006.01)
(Continued)

(52) U.S. Cl.
CPC .............. *H02J 3/381* (2013.01); *G05B 15/02* (2013.01); *H02J 3/46* (2013.01); *H02J 2300/24* (2020.01);
(Continued)

(58) Field of Classification Search
USPC ........................................................ 700/287
See application file for complete search history.

(56) References Cited

U.S. PATENT DOCUMENTS 9,300,224 B2 3/2016 Johnson et al.
9,806,665 B2 10/2017 Johnson
(Continued)

FOREIGN PATENT DOCUMENTS

WO WO 2015/123549 8/2015
WO WO-2015123549 A1 * 8/2015 .............. H02J 3/381

OTHER PUBLICATIONS

Official Action for U.S. Appl. No. 17/130,970, dated Aug. 5, 2022, 14 pages.
(Continued)

*Primary Examiner* — Emilio J Saavedra
(74) *Attorney, Agent, or Firm* — Sheridan Ross PC

(57) ABSTRACT

A method of controlling a renewable energy power plant is provided. The method includes retrieving output power measurement values for each inverter of a total number of inverters from a plurality of sensors provided at a location proximal to each inverter and retrieving a point of interconnection (POI) output measurement value for the renewable energy power plant based on a plurality of ON inverters of the total number of inverters. The method also includes calculating a POI measured setpoint for the renewable energy power plant based on a difference between a power reference value for the renewable energy power plant and the retrieved POI output measurement value for the renewable energy power plant, assigning a setpoint to each of the ON inverters and classifying each ON inverter as either a TRACKING ON inverter or a NON-TRACKING ON inverter based on whether each ON inverter is tracking at the setpoint.

20 Claims, 12 Drawing Sheets

Related U.S. Application Data

(60) Provisional application No. 63/052,829, filed on Jul. 16, 2020.

(51) Int. Cl.
*H02J 3/38* (2006.01)
*H02M 7/44* (2006.01)

(52) U.S. Cl.
CPC ............ *H02J 2300/26* (2020.01); *H02M 7/44* (2013.01); *Y04S 10/123* (2013.01)

(56) References Cited

U.S. PATENT DOCUMENTS

| | | |
|---|---|---|
| 11,626,737 B2 | 4/2023 | Wenrick |
| 2012/0084027 A1* | 4/2012 | Caine ................... H02S 50/10 |
| | | 702/58 |
| 2013/0106196 A1* | 5/2013 | Johnson .................. H02J 3/381 |
| | | 307/82 |
| 2016/0190810 A1 | 6/2016 | Bhavaraju et al. |

OTHER PUBLICATIONS

Notice of Allowance for U.S. Appl. No. 17/130,970, dated Dec. 2, 2022, 11 pages.

\* cited by examiner

PHOTOVOLTAIC POWER PLANT ENERGY HARVEST OPTIMIZATION—CAPACITY FACTOR, DELTA-P LOSS AND RAMP RATE COMPENSATION

RELATED APPLICATIONS

This U.S. Non-Provisional patent application is a Continuation of U.S. Non-Provisional patent application Ser. No. 17/130,970, filed on Dec. 22, 2020, which issued as U.S. Pat. No. 11,626,737 on Apr. 11, 2023, and claims the benefit of priority to U.S. Provisional Patent Application No. 63/052,829, filed Jul. 16, 2020, entitled "Photovoltaic Power Plant Energy Harvest Optimization—Capacity Factor, Dynamic Delta P and Ramp Rate Compensation," which is incorporated herein by reference in its entirety for all that it teaches and for all purposes.

FIELD OF THE INVENTION

Embodiments of the present disclosure relate to systems and methods for real-time processing of data and more particularly to systems and methods for optimizing photovoltaic power plants.

BACKGROUND

Commercial and utility-scale photovoltaic ("PV") power systems and plants generally organize solar panels into an array of PV strings. Typically, each string in the array contains the same number of solar panels, connected in series, as all other PV strings in the same system to produce the rated DC operating voltage. The PV strings are connected in parallel to produce the current necessary for efficient DC to AC conversion given the rated capacity of inverters used in the DC to AC conversion process which is suitable for coupling to a power grid at a point of interconnection (POI).

PV power plants require a significant initial investment and ongoing maintenance effort in order to meet their performance expectations over the lifetime of the plant. Accordingly, it is important to accurately and chronologically monitor key parameters of the PV power plant to evaluate the performance of the PV power plant. By monitoring PV power plants, component failures and losses caused by factors that negatively affect the efficiency of the PV power plant, such as snow accumulation and soiling of solar panels, for example, may be identified and corrected. The output of the PV power plant at the POI, such as voltage, reactive power, real power, and power factor are controlled to be within a range of specific values to meet requirements. PV power plants, however, undergo periods of intermittent production when for example, there is limited fuel (i.e., irradiance) supplied to the power plant. During these periods of intermittent production, the power plant produces less than the nameplate capacity (e.g., rated capacity, nominal capacity, installed capacity, or maximum effect) which is the maximum rated output of the inverter for the power plant under specific, conditions designated by the manufacturer.

Knowing with certainty the maximum power curve (i.e., potential instantaneous output) for the entire power plant is an exercise in diminishing returns for owners/manufacturers of the power plant as well as for purchasers of the renewable energy provided by the power plant. At best, what is known are measured readings at a few points, but one cannot take these few points to determine the potential instantaneous output. That would require integrating all the irradiance at any given time. For example, there are added costs associated with investments in providing additional equipment such as sensors and in allocating time to performing tests which are required to determine the maximum power curve. Compounding this uncertainty are power plant controllers that are responsible for controlling the flow of power, active power (the actual power dissipated in the system) and reactive (useless power which cycles between the source, i.e., the power plant and the sink, i.e., the grid), through the POI. It is typical for there to be requirements related to power rate (the rate at which the power from the power plant can change) and power limit (the maximum power output by the power plant), which sets constrained boundary conditions for the PV power plant.

The boundary conditions are a combination of limits that are imposed by physical (e.g. equipment ratings, mechanical limits, weather) and economic (e.g. grid stability, price, power purchase agreements, time of use) constraints. It is typical to size a power plant, within a very approximate range of 10-20 percent, larger than the intended maximum, active power output limit. This is strategic and ultimately allows inverters to operate as low as 80% capacity on an ideal solar day. This extends and optimizes the inverter's useful life span, and allows a margin of error in generating the required energy, from the power plant, to meet contractual obligations. With the additional capacity, the power plant's maximum available power curve may be above the contractual maximum power limit. Thus, a boundary condition is formed by this power limit. In order to maintain the frequency on the grid at 60 Hz, the power injected into the grid, "Pi", and power dissipated from the grid, "Po", always need to be equal. Given the unpredictability of fuel, (i.e., the irradiance) in the PV plant context, Pi becomes unpredictable as more PV plants are connected to the grid. When this happens, the grid frequency tends to slow, with a sudden loss in demand, a reduction in Po, the frequency tends to increase. Conventionally, inertial dampening and speed governing systems stem the initial droop in time for peaking plants to increase or decrease output to meet demand. However, as renewable penetrations continue and accelerate, the percentage of inertia storing generators on the grid will decline and a need for a fast reacting, local frequency response will become commonplace. There are mechanisms known for adjusting the frequency of the grid that help to balance the equation. By requiring PV power plants to predictably ramp their power up and down at certain rates, a defensive strategy, positive, if available, and negative power reserve can be used in response to the change in frequency on the grid at any given time. Thus, a POI rate limit is formed where the POI rate limit is defined as the maximum increase or decrease in power per unit time allowed at the POI.

These physical and economic constraints make it difficult to generate a maximum power curve which conforms to the purchaser's power quality requirements while not sacrificing energy, which the owners/manufacturers have a vested interest in preserving. When there is an uncertain irradiance gradient across a PV solar panel, typical control methods cause losses to accrue in a way that is not proportional to the available irradiance for an individual array of PV strings. For inverters that are unconstrained from a fuel perspective but constrained by a power limit, compensation techniques are essential for allowing a power plant to produce near an optimal power curve (a cure that follows the power rate requirements and does not exceed the power limit requirements) under varying resource availability, especially for rate and limit constrained power systems. As renewable power grid penetration increases and spinning reserve (the amount of unused capacity which can compensate for power shortages or frequency drops within a given period of time) decreases, dispatchable renewable power plants which must operate with rate and limit constraints will not only become more common but will become widely necessary. Compensation will improve profitability for owners/manufacturers while providing better and more predictable power to purchasers.

Thus, there is a need for a system and method that can harvest additional energy from a PV power plant while providing a smooth and predictable supply of power from the PV power plant to the utility grid by compensating for losses.

SUMMARY OF THE INVENTION

In accordance with the present disclosure, a PV plant compensation system and method are provided that require considerably less hardware than existing systems. Additionally, the system and method described herein can be employed to determine which inverters are operating and which inverters are not operating. After determining which inverters are operating and which inverters are not operating, the system and method determines which of the operating inverters have a power output which matches a predetermined setpoint (TRACKING ON inverters) and which of the operating inverters have a power output that does not match the predetermined setpoint (NON-TRACKING ON inverters). For the operating inverters that have a power output that does not match the predetermined setpoint (NON-TRACKING ON inverters), the power output is increased until it matches the predetermined setpoint.

The present disclosure provides a number of advantages depending on the particular aspect, embodiment, and/or configuration. Although embodiments of the present disclosure are directed to solar energy, other forms of renewable energy such as wind energy, hydropower energy, geothermal energy, hydroelectric energy, hydrogen energy, bioenergy, etc. can be used without departing from the spirit and scope of the present disclosure. For example, methods and systems according to embodiments of the present disclosure can generally be applied to renewable energy systems (e.g., power plants) when the following conditions are met: (1) a renewable energy power plant where the total rated capacity of the renewable energy power plant is made up of an aggregation of generators (inverters) with smaller capacities and the aggregate output is conjoined at a POI; (2) the inverters' availability (ON) and fuel levels (i.e. sun, wind, water, heat, etc.) can be uncertain; and (3) there are rate and or output limitations imposed by the interconnection agreement with the utility company.

Embodiments include a method of controlling a renewable energy power plant. The method includes retrieving a sum of output power measurement values for each inverter of a total number of inverters from a plurality of sensors, with each sensor provided at a location proximal to each inverter and retrieving a point of interconnection (POI) output measurement value for the renewable energy power plant based on a plurality of ON inverters of the total number of inverters. The method also includes calculating a POI measured setpoint for the renewable energy power plant based on a difference between a power reference value for the renewable energy power plant and the retrieved POI output measurement value for the renewable energy power plant and calculating a summation of output power measurement values for the ON inverters based on a capacity factor for the ON inverters. The method further includes calculating a setpoint for the renewable energy power plant, assigning the setpoint to each of the ON inverters and classifying each ON inverter as either a TRACKING ON inverter or a NON-TRACKING ON inverter based on whether each ON inverter is tracking at the setpoint.

Aspects of the above method include increasing the setpoint in response to detecting the summation of output power measurements from each of the ON inverters is less than the setpoint.

Aspects of the above method include calculating a loss value for the TRACKING ON inverters, calculating a deviation percentage from the loss value and adding the deviation percentage to the setpoint for the TRACKING ON inverters to generate an adjusted setpoint.

Aspects of the above method include applying the adjusted setpoint to the TRACKING ON inverters until at least one of: the TRACKING ON inverters are no longer tracking and become NON-TRACKING ON inverters, the TRACKING ON inverters are outputting at their rated capacity, and the power reference value for the renewable energy power plant has been reached.

Aspects of the above method include the POI output measurement value is retrieved from a meter provided between the renewable energy power plant and a power grid.

Aspects of the above method include correcting the setpoint for the NON-TRACKING ON inverters and adding a rate limited setpoint increase to the NON-TRACKING ON inverters.

Aspects of the above method include the rate limited setpoint increase is inversely proportional to a number of NON-TRACKING ON inverters.

Embodiments include a renewable energy power plant controller. The renewable energy power plant controller comprising a processor and memory device and the renewable energy power plant controller is configured to retrieve a sum of output power measurement values for each inverter of a total number of inverters from a plurality of sensors, with each sensor provided at a location proximal to each inverter, retrieve a point of interconnection (POI) output measurement value for a renewable energy power plant based on a plurality of ON inverters of the total number of inverters, calculate a POI measured setpoint for the renewable energy power plant based on a difference between a power reference value for the renewable energy power plant and the retrieved POI output measurement value for the renewable energy power plant, calculate a summation of output power measurement values for the ON inverters based on a capacity factor for the ON inverters, calculate a setpoint for the renewable energy power plant, assign the setpoint to each of the ON inverters and classify each ON inverter as either a TRACKING ON inverter or a NON-TRACKING ON inverter based on whether each ON inverter is tracking at the setpoint Aspects of the above renewable energy power plant controller include the renewable energy power plant controller further configured to increase the setpoint in response to detecting the summation of output power measurements from each of the ON inverters is less than the setpoint.

Aspects of the above renewable energy power plant controller include the renewable energy power plant controller further configured to calculate a loss value for the TRACKING ON inverters, calculate a deviation percentage from the loss value and add the deviation percentage to the setpoint for the TRACKING ON inverters to generate an adjusted setpoint.

Aspects of the above renewable energy power plant controller include the renewable energy power plant controller further configured to apply the adjusted setpoint to the TRACKING ON inverters until at least one of: the TRACKING ON inverters are no longer tracking and become NON-TRACKING ON inverters, the TRACKING ON inverters are outputting at their rated capacity, and the power reference value for the renewable energy power plant has been reached Aspects of the above renewable energy power plant controller include the POI output measurement value is retrieved from a meter provided between the renewable energy power plant and a power grid.

Aspects of the above renewable energy power plant controller include the renewable energy power plant controller further configured to correct the setpoint for the NON-TRACKING ON inverters and add a rate limited setpoint increase to the NON-TRACKING ON inverters.

Aspects of the above renewable energy power plant controller include wherein the rate limited setpoint increase is inversely proportional to a number of NON-TRACKING ON inverters.

Embodiments include one or more non-transitory computer-readable storage media having computer-executable instructions embodied thereon for controlling a plurality of renewable energy inverters, wherein when executed by a renewable energy power plant controller, the computer-executable instructions cause the renewable energy power plant controller to retrieve a sum of output power measurement values for each inverter of a total number of inverters from a plurality of sensors, with each sensor provided at a location proximal to each inverter, retrieve, from an electric meter, a point of interconnection (POI) output measurement value for a renewable energy power plant based on a plurality of ON inverters of the total number of inverters, calculate a POI measured setpoint for the renewable energy power plant based on a difference between a power reference value for the renewable energy power plant and the retrieved POI output measurement value for the renewable energy power plant, calculate a summation of output power measurement values for the ON inverters based on a capacity factor for the ON inverters, calculate a setpoint for the renewable energy power plant, assign the setpoint to each of the ON inverters and classify each ON inverter as either a TRACKING ON inverter or a NON-TRACKING ON inverter based on whether each ON inverter is tracking at the setpoint.

Aspects of the above computer-readable storage media include wherein the computer-executable instructions also cause the renewable energy power plant controller to increase the setpoint in response to detecting the summation of output power measurements from each of the ON inverters is less than the setpoint.

Aspects of the above computer-readable storage media include wherein the computer-executable instructions also cause the renewable energy power plant controller to calculate a loss value for the TRACKING ON inverters, calculate a deviation percentage from the loss value and add the deviation percentage to the setpoint for the TRACKING ON inverters to generate an adjusted setpoint.

Aspects of the above computer-readable storage media include wherein the computer-executable instructions also cause the renewable energy power plant controller to apply the adjusted setpoint to the TRACKING ON inverters until at least one of: the TRACKING ON inverters are no longer tracking and become NON-TRACKING ON inverters, the TRACKING ON inverters are outputting at their rated capacity, and the power reference value for the renewable energy power plant has been reached.

Aspects of the above computer-readable storage media include wherein the computer-executable instructions also cause the renewable energy power plant controller to correct the setpoint for the NON-TRACKING ON inverters and add a rate limited setpoint increase to the NON-TRACKING ON inverters.

Aspects of the above computer-readable storage media include wherein the rate limited setpoint increase is inversely proportional to a number of NON-TRACKING ON inverters.

References made herein to "photovoltaic arrays," "photovoltaic systems," "photovoltaic modules," or "solar panels," should not necessarily be construed as limiting the present disclosure to a particular type of solar power plant. It will be recognized by one skilled in the art that the present disclosure may be used to analyze and classify losses for any type of solar power plant, including concentrating solar power systems and solar thermal power systems.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium," as used herein, refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The term "desktop," as used herein, refers to a metaphor used to portray systems. A desktop typically includes pictures, called icons, that show applications, windows, cabinets, files, folders, documents, and other graphical items. The icons are generally selectable through user interface interaction to allow a user to execute applications or conduct other operations.

The term "display", as used herein, refers to a portion of a display image used to display the output of a computer to a user.

The term "displayed image", as used herein, refers to an image produced on the display. A typical displayed image is a window or desktop. The displayed image may occupy all or a portion of the display.

The term "module," as used herein, refers to any known or later developed hardware, software, computer readable medium, firmware, artificial intelligence, fuzzy logic, or combination of hardware and software with functionality associated with a particular task and that is capable of performing the functionality associated with that task.

The term "window", as used herein, refers to a, typically rectangular, displayed image on part of a display that contains or provides content different from the rest of the screen.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the present disclosure, brief description of the drawings, detailed description, abstract, and claims themselves.

The preceding is a simplified summary of the present disclosure to provide an understanding of some aspects of the present disclosure. This summary is neither an extensive nor exhaustive overview of the present disclosure and its various aspects, embodiments, and/or configurations. It is intended neither to identify key or critical elements of the present disclosure nor to delineate the scope of the present disclosure but to describe selected concepts of the present disclosure in a simplified form as an introduction to the more detailed description presented below. As will be appreciated, other aspects, embodiments, and/or configurations of the present disclosure are possible utilizing, alone or in combination, one or more of the features set forth above or described in detail below.

Other features and advantages of the present disclosure will become apparent from a review of the following detailed description, taken in conjunction with the drawings.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following detailed description describes one or more embodiments of the disclosed system and method. First, the detailed description provides a description of a network system and a computer system that may be used in connection with the compensation system and method disclosed herein. The detailed description then provides a disclosure of embodiments of the compensation system and method disclosed herein. The detailed description further provides various user interfaces or outputs generated by the compensation system and method disclosed herein.

Figure 1:
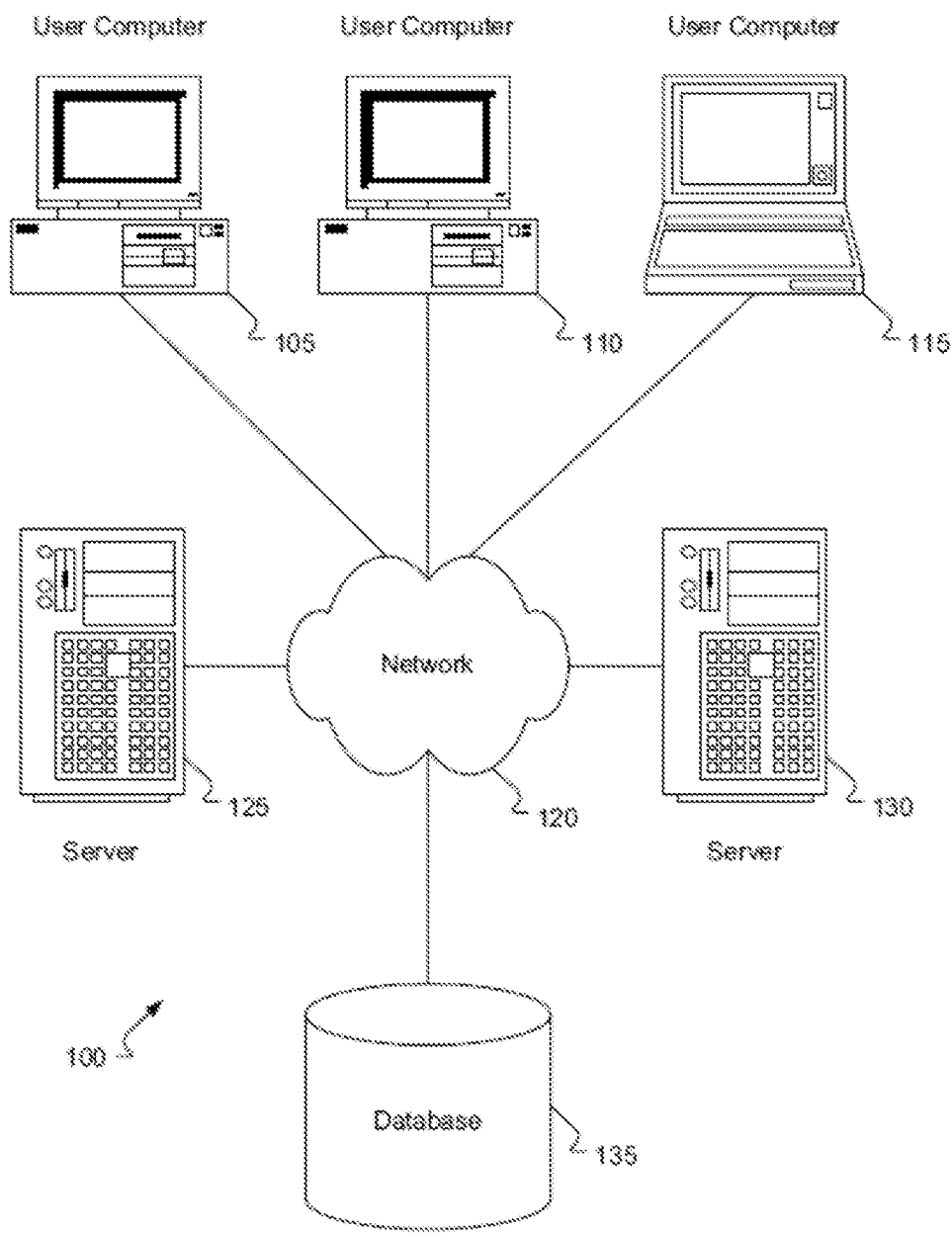
FIG. 1 is an example communications/data processing network system that may be used in conjunction with embodiments of the present disclosure.

Referring to FIG. 1, an example network system is provided that may be used in connection with the compensation system and method disclosed herein. More specifically, FIG. 1 illustrates a block diagram of a system 100 that may use a compensation system to compensation for the losses of PV power plant. The system 100 includes one or more data processors, such as user computers 105, 110, and 115. The user computers 105, 110, and 115 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

System 100 further includes a network 120. The network 120 may be any type of network familiar to those skilled in the art that can support data communications using any of a variety of commercially-available protocols, including without limitation TCP/IP, SNA, IPX, AppleTalk, and the like. Merely by way of example, the network 120 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 125, 130. One server may be a web server 125, which may be used to process requests for web pages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like. In some instances, the web server 125 may publish operations available as one or more web services.

The system 100 may also include one or more file and/or application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 130 may also include database servers, including without limitation those commercially available from Oracle, Microsoft, Sybase™, IBM™ and the like, which can process requests from database clients running on a user computer 105.

In some embodiments, an application server 130 may create web pages dynamically for displaying information and reports generated by the compensation system. The web pages created by the web application server 130 may be forwarded to a user computer 105 via a web server 125. Similarly, the web server 125 may be able to receive web page requests, web services invocations, and/or input data from a user computer 105 and can forward the web page requests and/or input data to the web application server 130.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

The system 100 may also include a database 135. The database 135 may reside in a variety of locations. By way of example, database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10i™, that is adapted to store, update, and retrieve data in response to SQL-formatted commands.

Figure 2:
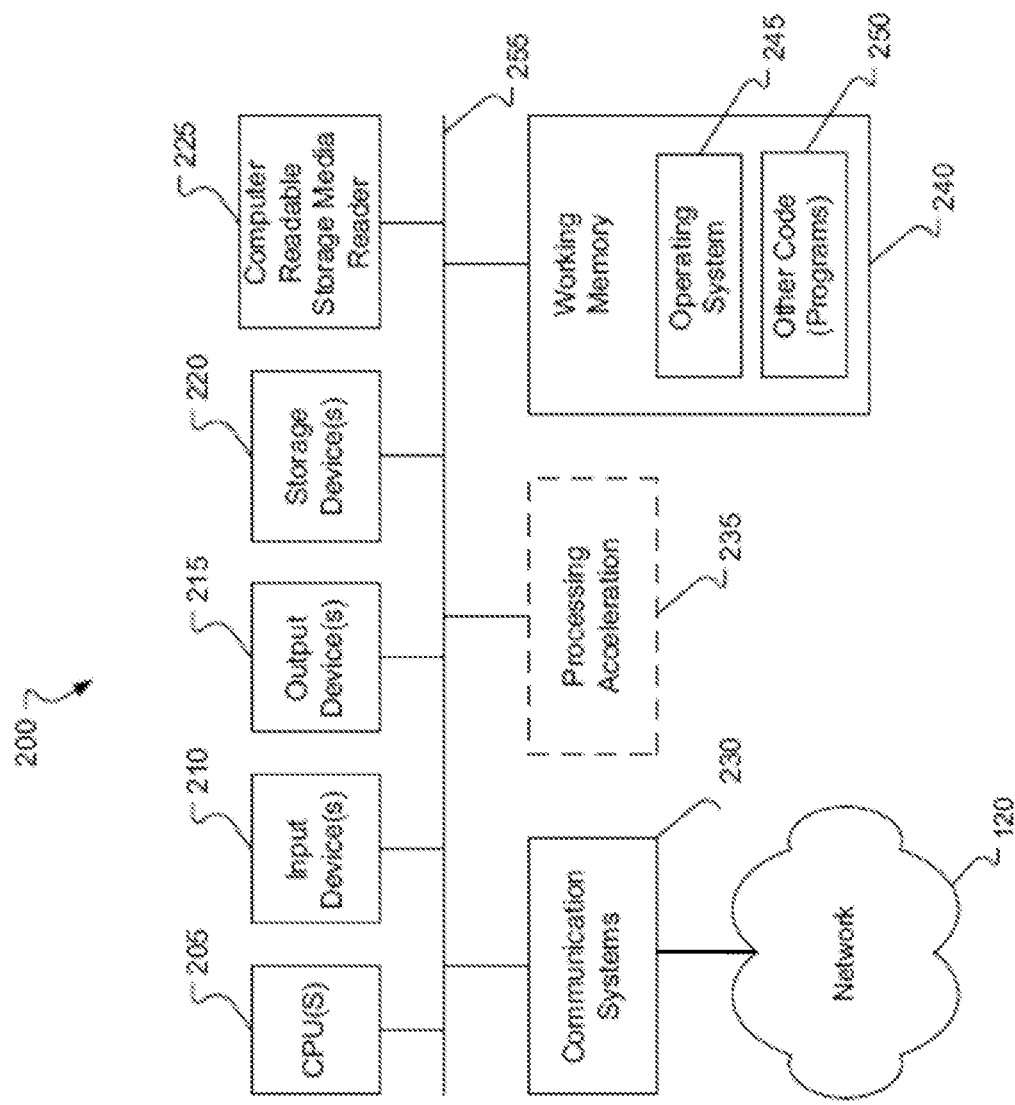
FIG. 2 is an example data processing system that may be used in conjunction with embodiments of the present disclosure.

Referring to FIG. 2, an example data-processing system is provided that may be used in connection with the compensation system and method disclosed herein. More specifically, FIG. 2 illustrates one embodiment of a data-processing system 200 upon which the compensation system or components of a compensation system may be deployed or executed. The data-processing system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The data-processing system 200 may also include one or more storage devices 220. By way of example, storage device(s) 220 may be disk drives, optical storage devices, solid-state storage device such as a random access memory ("RAM") and/or a read-only memory ("ROM"), which can be programmable, flash-updateable and/or the like.

The data-processing system 200 may additionally include a computer-readable storage media reader 225; a communications system 230 (e.g., a modem, a network card (wireless or wired), an infra-red communication device, etc.); and working memory 240, which may include RAM and ROM devices as described above. In some embodiments, the data-processing system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other data-processing described above with respect to the system 100.

The data-processing system 200 may also comprise software elements, shown as being currently located within the working memory 240, including an operating system 245 and/or other code 250, such as program code implementing a compensation system or components of a compensation system. It should be appreciated that alternate embodiments of a data-processing system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3A:
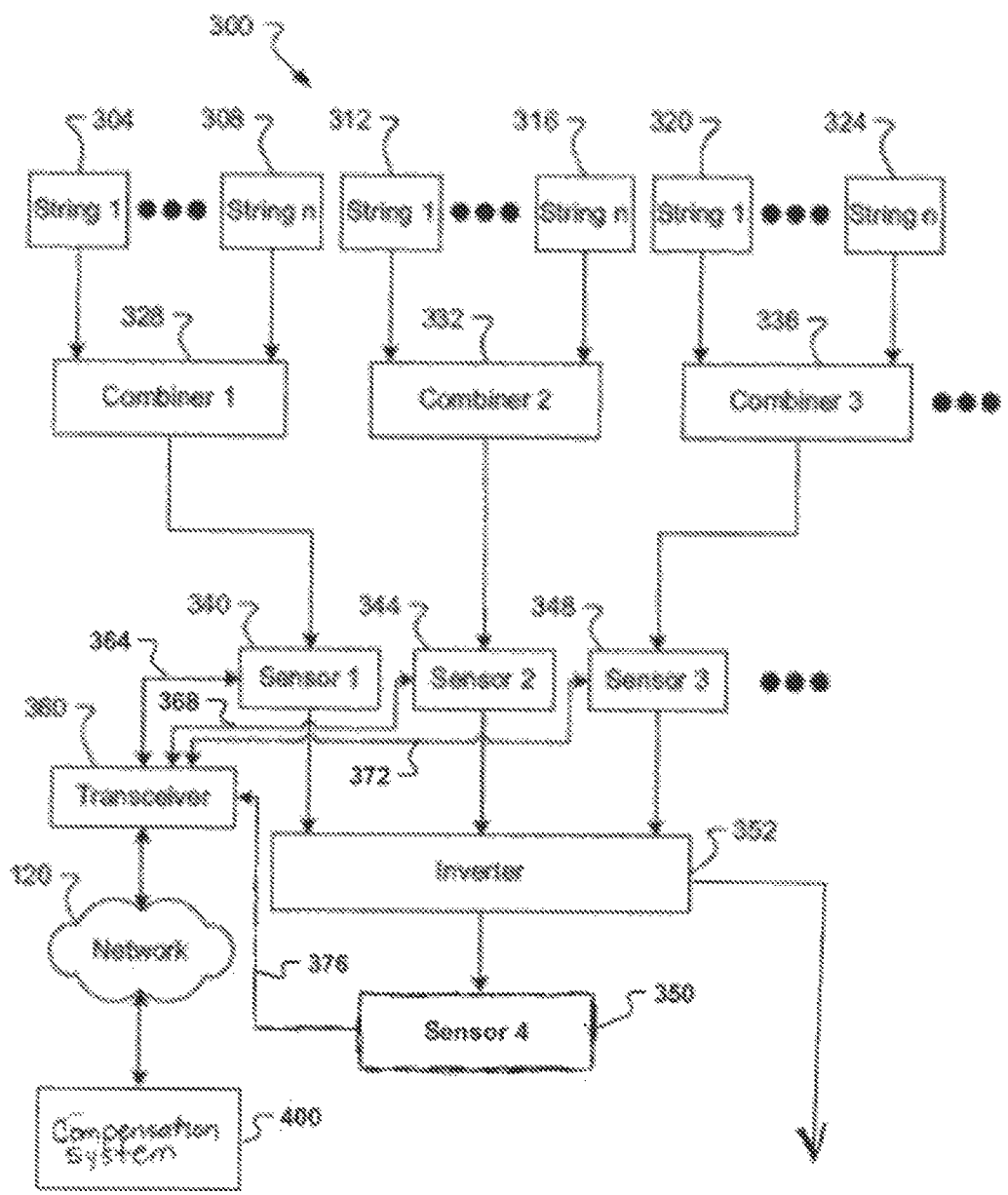
FIG. 3A is a block diagram illustrating components of a photovoltaic (PV) power plant in conjunction with a compensation system in accordance with an embodiment of the present disclosure.

FIG. 3A is a block diagram illustrating components of a PV power plant in conjunction with a compensation system in accordance with an embodiment of the present disclosure. The PV power plant 300 includes a plurality of PV strings 304, 308, 312, 316, 320, 324, a plurality of combiners 328, 332, 336 and an inverter 352. Each PV string consists of individual solar panels, typically eight to twelve panels, wired in series. The output signals of the PV strings are wired, in parallel, into the combiners 328, 332, 336. Each combiner can receive output signals from one or more PV string. For example, in FIG. 3A, PV String 1 304 through PV String n 308 are wired into combiner 1 328, PV String 1 312 through PV String n 316 are wired into combiner 2 332, and PV String 1 320 through PV String n 324 are wired into combiner 3 336. Each combiner sums the power signals of their PV strings, thereby providing a cumulative direct current ("DC") power output that is associated with a plurality of PV strings. The output signals of combiners 328, 332, 336 are wired into the inverter 352. In FIG. 3A, only one inverter is illustrated. However, in large PV power plants, multiple inverters are employed, each accepting output signals of multiple combiners. The inverter 352 converts the DC power of the solar panels into three phase alternating current ("AC") power which ultimately can be used by commercial power plants.

As illustrated in FIG. 3A, measurement hardware, such as sensors 340, 344, 348, detect the input signals of the inverters 352. In addition, measurement hardware includes sensors 350 that detects the output signals for each inverter 352. The sensors may be separate from the inverter 352, or the sensors may be incorporated into the inverter 352. Optionally, measurement hardware, such as sensors 340, 344, 348, can measure the output of each individual string 304-324 instead of the output of combiners 328, 332, 336. The choice of how many strings 304-324 each sensor measures is a tradeoff between the cost of the sensors required and the signal to noise ratio for detecting a single string failure.

By locating the sensors near the inverter 352, the hardware costs, such as the quantity of sensors and associated wiring, is significantly reduced. This is especially important for large PV systems where thousands of strings are employed. Each sensor 340, 344, 348, 350 and the individual data entries detected by the sensor, is associated with a data channel. As shown in FIG. 3A, sensor 1 340 is associated with a first data channel 364, sensor 2 344 is associated with a second data channel 368, sensor 3 348 is associated with a third data channel 372, and sensor 4 350 is associated with a fourth data channel 376. Each data channel is associated with the individual data entries detected by the respective sensors.

To further reduce hardware costs, in at least one embodiment, each combiner sums the output of at least six PV strings, and preferably, at least twelve PV strings. This reduces the number of combiners required in a PV power plant, as well as reducing the number of sensors and associated wiring required to monitor the performance of the PV power plant. Accordingly, each sensor detects data that is associated with a plurality of PV strings. This data is collected and analyzed by the compensation system 400 to analyze and compensate for losses of the PV power plant 300.

In the ideal case, the signal to noise level can be defined as 1/n, where n is the number of strings in a group. For example, with ten strings per group, a single string failure would result in a ten percent reduction in current at the inverter input. However, the ideal case is not achievable because the signal-to-noise ratio is further reduced due to measurement errors, differences between solar panels, mounting, and environmental conditions such as cloud shading, soiling (dirt on the panels), and obstructions. Embodiments of the compensation system and method utilize a number of approaches to compensate for these noise issues, thus enabling the detection of single string failures or performance degradation from a data channel associated with a plurality of PV strings.

Referring back to FIG. 3A, the sensors 340, 344, 348, 350 are in communication with a transceiver 360, which transmits the sensor data through the network 120 to the compensation system 400. The sensor data may be at least one of current and voltage data. Examples of sensors include, but are not limited to, voltage transformers (VT), current transformers (CT), and Hall Effect sensors. As shown in FIG. 3A, each sensor 340, 344, 348, is associated with an output signal of a combiner, which is the summation of a plurality of PV strings. Sensor 350 is associated with an output signal of the inverter 352. Accordingly, the sensor data that is transmitted to the compensation system 400 is associated with a plurality of PV strings and inverters.

Figure 3B:
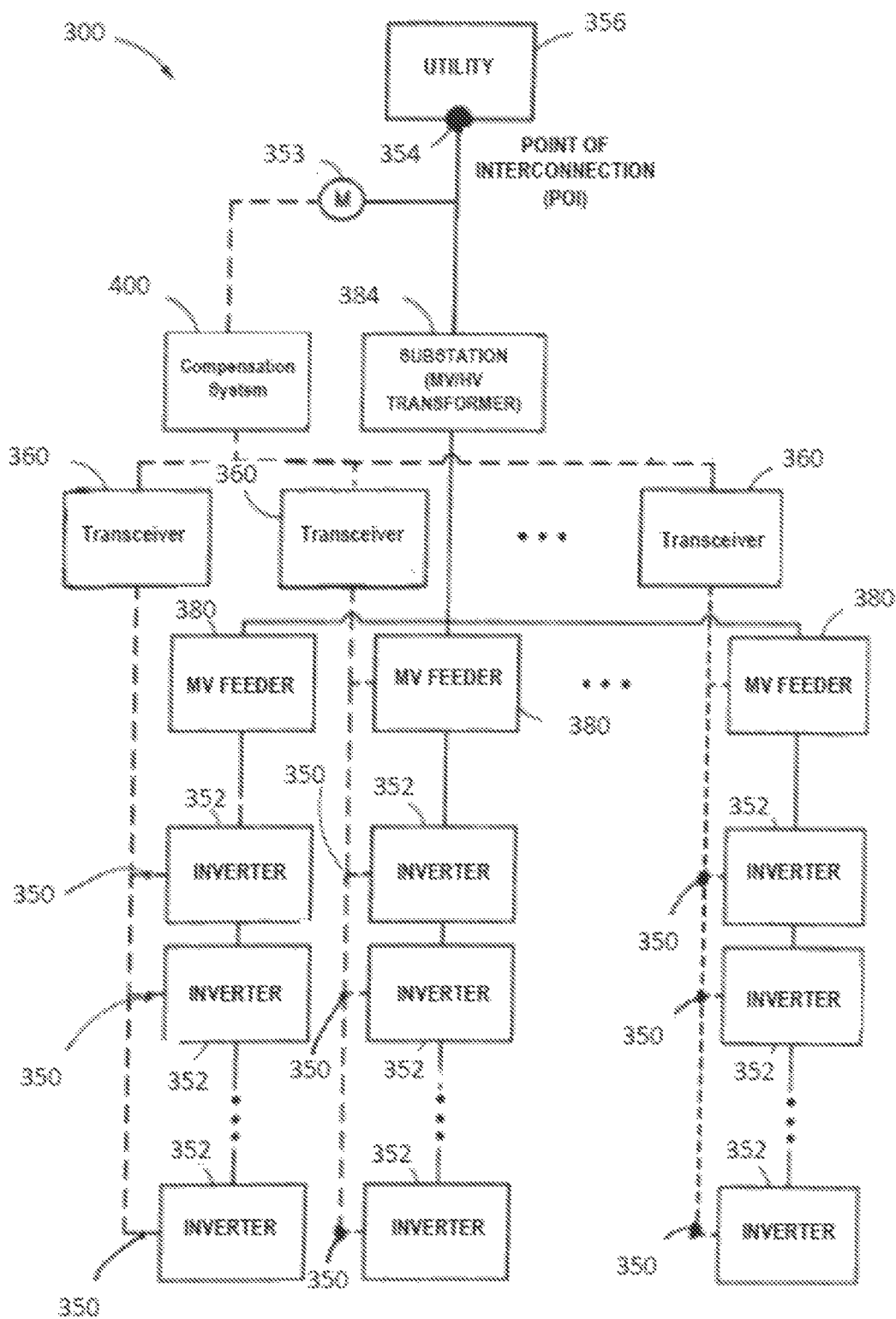
FIG. 3B is a block diagram illustrating additional components of the PV power plant in conjunction with a compensation system of FIG. 3A in accordance with an embodiment of the present disclosure.

FIG. 3B is a block diagram illustrating additional components of the PV power plant 300 in conjunction with a compensation system 400 of FIG. 3A in accordance with an embodiment of the present disclosure. FIG. 3B shows the inverters 352, sensors 350, transceivers 360 and the compensation system 400 described in connection with FIG. 3A. The strings, combiners, sensors 1-3 and network 120 are not shown in FIG. 3B for clarity of illustration. The PV power plant 300 is coupled to a utility power grid 356 at a point of interconnection (POI) 354. In the example of FIG. 3B, the output of a group of inverters 352 are coupled to the POI 354 by way of a medium voltage (MV) feeder 380 to a substation MV/HV (medium voltage/high voltage) transformer 384. There are several groups of inverters 352 in the PV power plant 300, with each group of inverters 352 being connected to its own MV feeder 380. The inverters 352 are typically located in inverter pads far from the POI 354 with the utility power grid 356. Due to the impedance of the AC collection system, the voltage and other outputs measured at terminals of an inverter 352 are not the same as the voltage and other outputs measured at the POI 354. The operation of a plurality of inverters 352 also needs to be coordinated to meet output requirements at the POI 354.

The compensation system 400 is configured to facilitate control of the PV power plant output (e.g., voltage) at or near the POI 354. In one embodiment of the present disclosure, the compensation system 400 controls setpoints of corresponding inverters 352 to achieve a desired PV power plant output at the POI 354. More specifically, the compensation system 400 may be configured to adjust a setpoint of an inverter(s) 352, the setpoint commanding the inverter 352 to generate a particular output value as discussed in greater detail below.

The meter 353 may comprise a conventional electrical meter or other sensing element with data communication capability. The meter 353 may comprise a root mean square (RMS) transmitter, revenue meter, protective relays, and other measurement/sensing apparatus. In the example of FIG. 3B, the meter 353 measures the output of the PV power plant 300 at the POI 354. This allows the meter 353 to have a reading of the PV power plant output to compare with readings at the terminals of the inverters 352 using sensors 350. Examples of PV power plant output measured by the meter 353 at the POI 354 include voltage, power factor, reactive power, and real power. In the example of FIG. 3B, the solid lines represent electrical power flow and the dash lines represent data flow. The data flow may be in accordance with Supervisory Control and Data Acquisition (SCADA) control.

Figure 4:
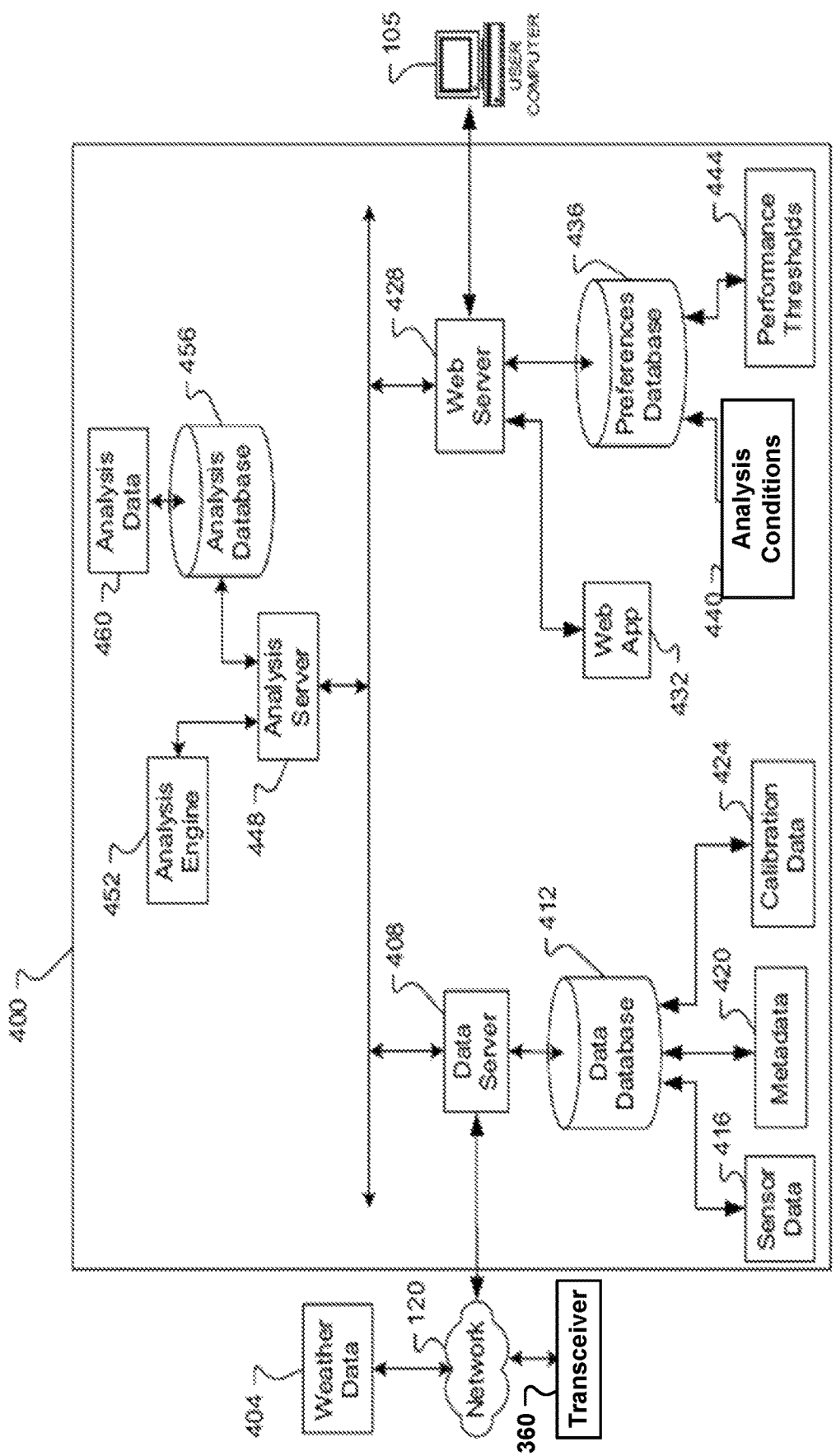
FIG. 4 is a block diagram of an embodiment of the compensation system according to the present disclosure.

FIG. 4 illustrates an embodiment of the compensation system 400 discussed above in connection with FIGS. 3A and 3B. As shown in FIG. 4, the compensation system 400 includes multiple servers and databases. The number and configuration of the servers and databases are shown for illustration purposes only and may be altered without departing from the scope of the present disclosure. For example, a single server and database may be utilized. As depicted in FIG. 4, a data server 408 is in communication with the network 120 and receives sensor data from one or more transceivers 360 . . . 360N associated with PV power plant 300. Optionally, the data server 408 may receive weather data 404. The weather data 404 may originate from a weather substation located at each of the PV power plant 300, and may include environmental conditions such as solar radiance, wind speed, wind direction, temperature, rain, snow, and humidity. Optionally, weather data 404 may be obtained from multiple locations within a PV power system 300 to detect and characterize weather variations within the PV power plant 300. For example, PV power plant 300 may include sensors that collect weather data 404 at each string or for all strings associated with a combiner. Measuring the solar radiance, using a pyranometer, allows the compensation system 400 to evaluate the impact of smog, haze, or clouds when determining an expected power output for the PV power plant 300 using a model for the PV power plant 300.

The data server 408 communicates with a data database 412, which stores sensor data 416, metadata 420, and calibration data 424 for the PV power plant 300 being monitored. Sensor data 416 may be voltage data or current data and may include instantaneous values as well as time-averaged data. The sensor data 416 may include information received from each sensor 340, 344, 348, 350 for the life of the PV power plant 300. The sensor data also includes data from meter 353 which measures the output of the PV power plant 300 at the POI 354. Metadata 420 includes data associated with the sensor data, such as weather data, timestamp, combiner identification, inverter identification, inverter capacity values and sensor identification. Calibration data 424 includes the initial calibration data recorded when the PV power plant 300 was first commissioned as well as periodic calibration data initiated by the compensation system 400. The calibration data 424 is associated with the data channels 364, 368, 372, 376 of the sensors 340, 344, 348, 350 of each PV power plant 300.

The data server 408 also communicates with a web server 428. The web server 428 communicates with a user computer 105, a web application 432, and a preferences database 436. The web application 432 includes a user interface that allows a user to monitor the performance of the PV power plant 300, to set analysis conditions 440, and to set performance thresholds 444. The web application 432 may also generate user configurable display images or user interfaces to display information to a user.

According to one embodiment of the present disclosure, the analysis conditions 440 are intended to determine which of the inverters 352 are operating in the "ON" state based on the sensor data from sensor 350. For example, this determination can be made based on performance thresholds 444 and the sensor data from sensor 350 to only recognize inverters 352 that have an output power value above a particular threshold. According to another embodiment of the present disclosure, the analysis conditions 444 may limit the analysis of the compensation system 400 to periods of time when each PV power plant 300 should be producing at least a minimum amount of power. At low power levels, measurement and other errors represent a larger contribution to the data than at higher power levels. Thus, by restricting the analysis to those times when the string power is above a preset threshold, the reliability of the compensation system 400 is improved. Analysis conditions 440 include the time of day the compensation system 400 will monitor the performance of each PV power plant 300, the position of the sun, geometric interference shading data, a minimum solar irradiation level, a minimum current or voltage level, and a minimum power level.

Performance thresholds 444 are used to detect an underperforming PV string and/or an underperforming inverter. Performance thresholds 444 include a comparator and a deviation value. Comparators include a specification performance comparator, a statistical average performance comparator, a channel-to-channel comparator, and a time-differential comparator. A specification performance comparator comprises comparing the actual performance of a plurality of PV strings and/or the PV array with the optimal performance of the strings and/or the PV system. The optimal performance, or expected output, of the PV strings and/or the PV system is determined by the compensation analysis engine 452. Likewise, the specification performance comparator also comprises comparing the actual performance of the inverters 352 with the optimal performance of the inverters 352 in the PV power plant 300. The optimal performance, or expected output, of the inverters 352 is determined by the compensation analysis engine 452 as discussed in greater detail below.

A statistical average performance comparator comprises comparing the actual performance of a plurality of PV strings and inverters with the statistical average performance of the strings and inverters, which may be determined during a testing phase of the PV power plant 300. A channel-to-channel comparator comprises comparing the actual performance of a plurality of PV strings and inverters with the actual performance of another plurality of PV strings or inverters. In some embodiments, a data entry received by one data channel may be compared to a data entry received from multiple other data channels. Additionally, in some embodiments, the channel-to-channel comparator may compare data entries associated with similar sun positions, even if the data entries were not detected at the same time or date. A time-differential comparator comprises comparing the actual performance of a plurality of PV strings and/or inverter with the performance of the plurality of PV strings and/or inverter at an earlier date. The time-differential comparator compares data entries associated with similar sun positions. For example, the time-differential comparator may compare a data entry associated with a plurality of PV strings and/or inverters with a data entry associated with the same plurality of PV strings and/or inverter but detected one year earlier. Shorter-term comparisons, such as daily comparisons, help the compensation system 400 quickly identify and classify a failure or loss whereas longer-term comparisons, such as yearly comparisons, help the compensation system 400 identify performance degradation issues that are hard to detect in shorter-term comparisons. A single performance threshold comparator, or any combination thereof, may be utilized. In at least one embodiment, a channel-to-channel comparator and a time-differential comparator are utilized. The deviation value comprises a percentage variance that the actual performance can vary from the comparator value. The deviation value includes a predefined percentage, a standard deviation value, or a production impact.

The analysis conditions 440 and the performance thresholds 444 may be user-selectable. In one configuration, the user may set the analysis conditions 440 and thresholds 444 via a web application 432. During development testing, a simulated run-time environment is provided that can execute the conditions and thresholds under a set of predefined conditions. The simulations performed during development testing allow the user to test, debug and perfect the analysis conditions and performance thresholds before deployment. The simulated run-time environment testing package is stored in a database for continued development and editing, thereby allowing a user to test new analysis conditions and performance thresholds before entering them into the production web servers. Accordingly, a user may set the compensation conditions and thresholds under which the compensation system 400 will analyze the sensor data and monitor performance of a PV power plant 300. The conditions and thresholds may have predefined default values which will be used by the compensation system 400 until a user overrides the default values by entering a user-selectable value.

A compensation analysis server 448 is also provided in the compensation system 400. The compensation analysis server 448 communicates with the data server 408, the web server 428, as well as the compensation analysis engine 452 and the compensation analysis database 456. The compensation analysis database 456 stores the compensation analysis data 460. In addition, the compensation analysis database 456 may include a power reference value for the PV power plant, a loss value Delta-P, setpoints, an adjusted capacity, a power limit, a power rate limit, a rate limited setpoint increase, a capacity tracking value as well as other values discussed in greater detail below.

Figure 5A:
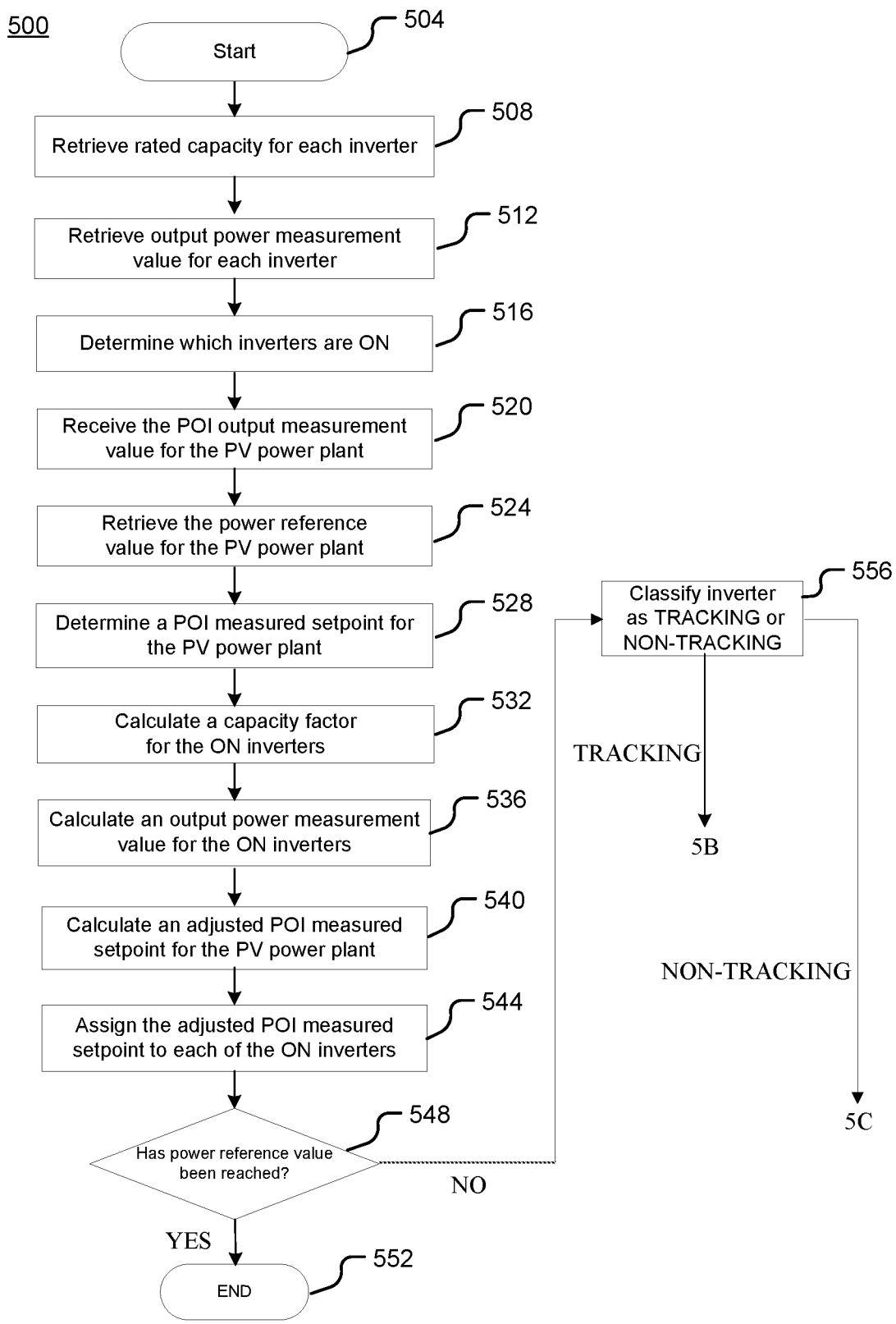
FIGS. 5A-5C is a flowchart of an embodiment of a compensation method according to the present disclosure.
Figure 5B:
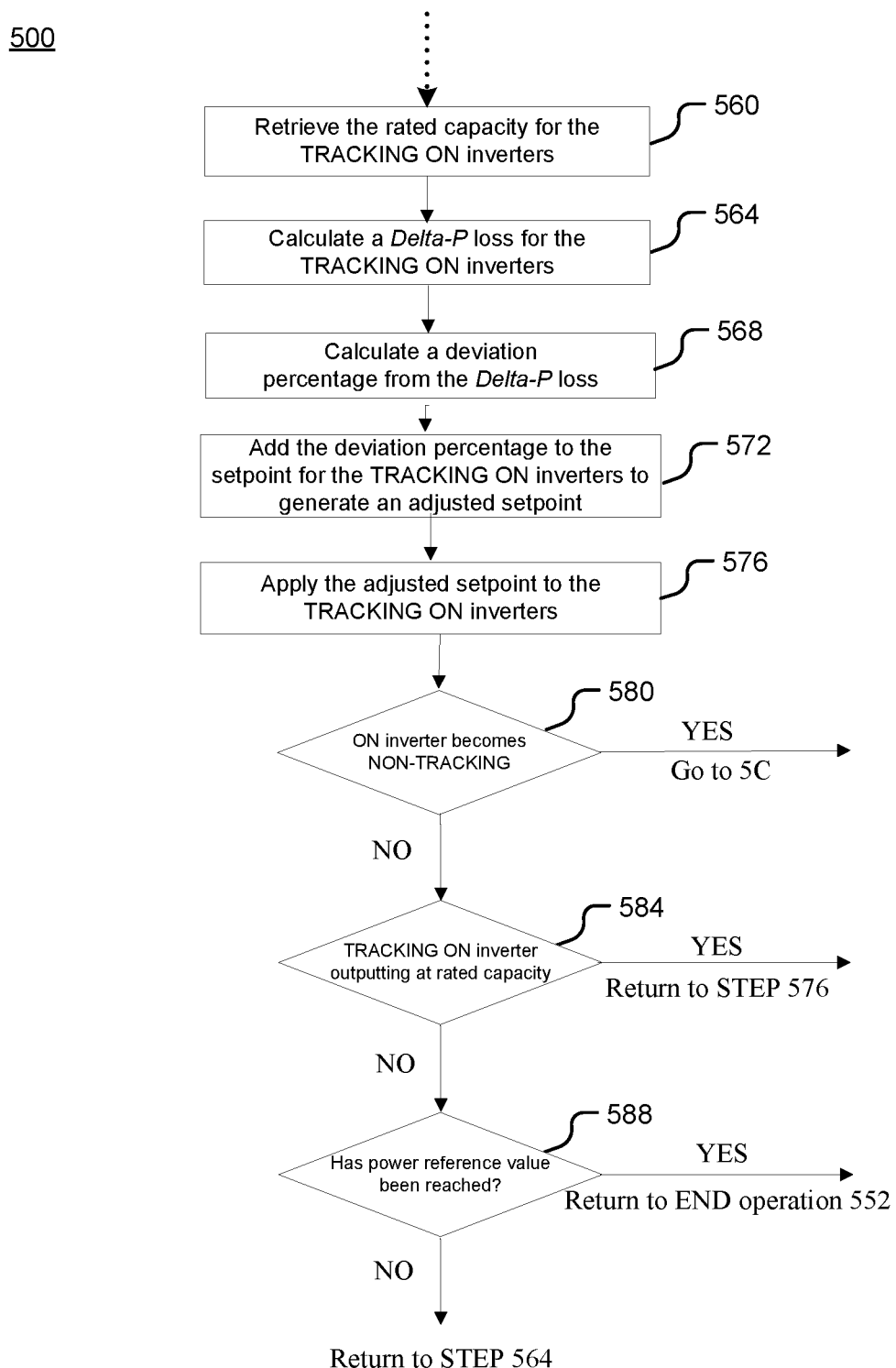
Figure 5C:
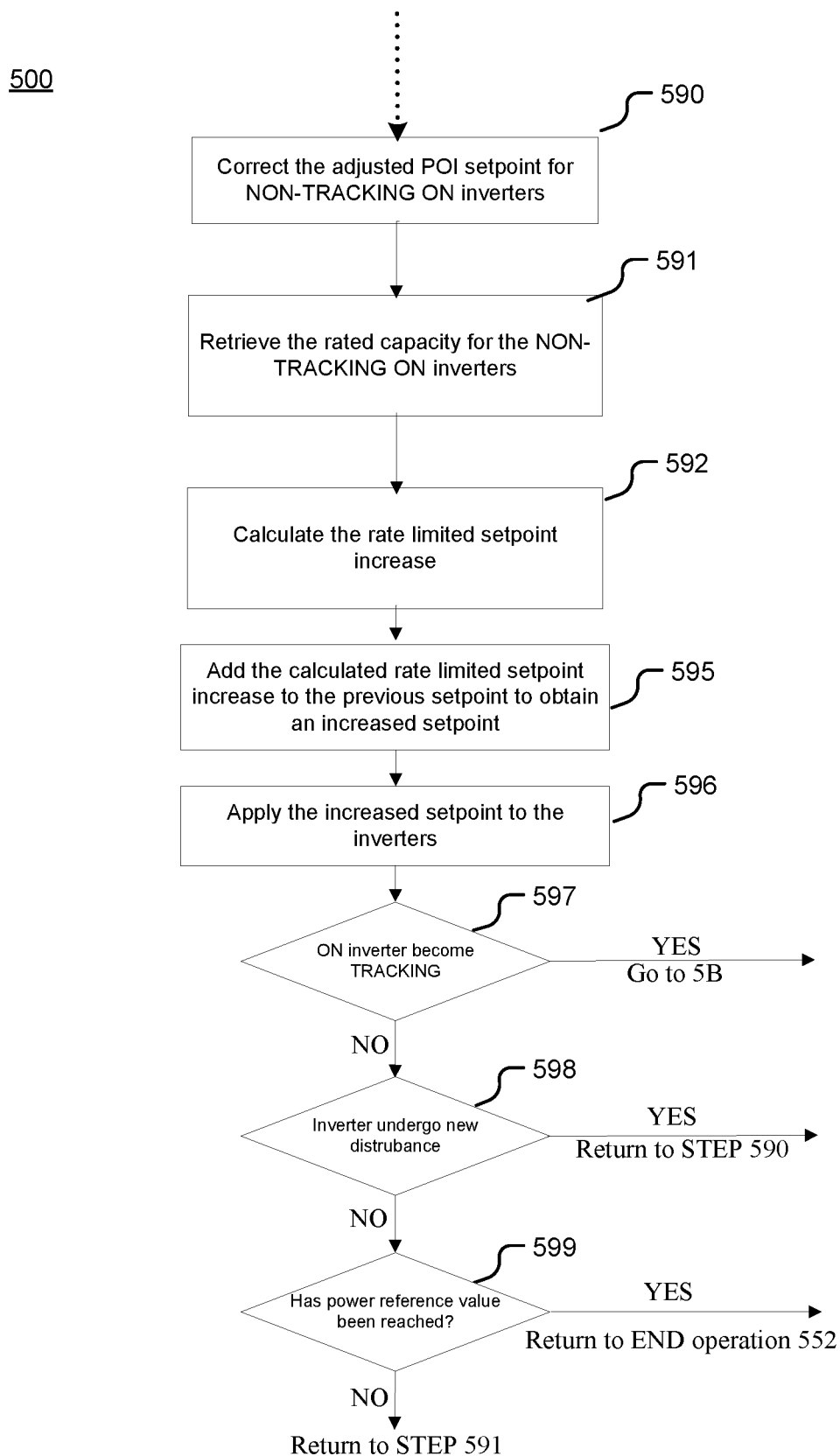

Referring now to FIGS. 5A-5C, an embodiment of a compensation method 500 of the present disclosure is illustrated. While a general order for the steps of the method 500 is shown in FIGS. 5A-5C, the method 500 can include more or fewer steps or can arrange the order of the steps differently than those shown in FIGS. 5A-5C. Further, two or more steps may be combined into one step. Generally, the method 500 starts with a START operation 504 and ends with an END operation 552. The method 500 can be executed as a set of computer-executable instructions executed by a data-processing system and encoded or stored on a computer readable medium. Hereinafter, the method 500 shall be explained with reference to the systems, components, modules, software, data structures, user interfaces, etc. described in conjunction with FIGS. 1-4 and 6-9.

Method 500 includes a capacity factor process described in FIG. 5A, a Delta-P loss process described in FIG. 5B and a ramp rate process described in FIG. 5C. Method 500 may begin at step 504 and proceed to step 508, where the compensation system 400 retrieves the rated capacity for each inverter. The rated capacity for each inverter is retrieved by compensation system 400 from the metadata stored in a database such as data database 412, preferences databased 436 and/or analysis database 456.

After retrieving the rated capacity for each inverter from the metadata from data database 412 for example at step 508, method 500 proceeds to step 512, where the compensation system 400 retrieves the output power measurement value from each of the sensors for each of the inverters. The output power measurement value from each of the sensors may be stored individually and also as a sum of each of the output power measurement values, for example, in a database such as data database 412, preferences databased 436 and/or analysis database 456.

After retrieving the output power measurement value from each of the sensors for each of the inverters at step 512, method 500 proceeds to step 516, where the compensation system 400, using for example the compensation analysis server 448 or the compensation analysis engine 452, determines which inverters are ON based on stored data related to each of the inverters. The stored data is, for example, data related to the analysis conditions 440 and the performance thresholds 444 along with metadata from the sensors to determine which of the inverters has an ON operating state and stored in a database such as data database 412, preferences databased 436 and/or analysis database 456.

After determining which inverters are ON at step 516, method 500 proceeds to step 520, where the compensation system 400 receives the POI output power measurement value for the PV power plant. The compensation system 400 receives the POI output power measurement value for the PV power plant from a metering device such as the meter 353 for example. As discussed in greater detail below, the POI output power measurement value for the PV power plant at step 520 is different than the output power measurement value from the sum of each of the sensors for each of the inverters at step 512.

After receiving the POI output power measurement value for the PV power plant at step 520, method 500 proceeds to step 524, where the compensation system 400 retrieves the power reference value for the PV power plant. The power reference value for the PV power plant is, for example, stored as metadata in a database such as data database 412, compensation database 456, preferences database 436 and/or any other storage facility.

After retrieving the power reference value for the PV power plant at step 524, method 500 proceeds to step 528, where the compensation system 400, using for example the compensation analysis server 448 and/or the compensation analysis engine 452, determines a POI measured setpoint for the PV power plant based on a difference between the power reference value for the PV power plant retrieved in step 524 and the received POI output power measurement value for the PV power plant at step 520.

After determining the POI measured setpoint for the PV power plant at step 528, method 500 proceeds to step 532, where the compensation system 400, using for example the compensation analysis server 448 and/or the compensation analysis engine 452, calculates a capacity factor for the ON inverters. The capacity factor for the ON inverters is based on the rated capacity of the ON inverters divided by the total rated capacity.

The capacity factor is determined in equation (1) which provides the following:

$$\text{Capacity Factor} = \frac{(ON \text{ Inverters}) * (\text{Rated Capacity})}{(\text{Total Number of Inverters}) * (\text{Rated Capacity})} \quad (1)$$

wherein the ON inverters represent a subset of the total capacity and the total number of inverters represent a total capacity. The loss associated with a less than unity capacity factor, is determined by equation (2) which provides the following:

$$P_{loss} = \text{Rated Capacity} * (1 - \text{Capacity Factor}) + C_{loss} \quad (2)$$

Where, $C_{loss}$, is an additional loss component caused by control system elements saturating prematurely but is not directly proportional to the capacity factor. The value of $C_{loss}$, depends on the capacity factor and other predetermined control thresholds. When an inverter is ON, its capacity is said to be available. By determining the capacity factor and using it to adjust setpoint calculations and measurement feedback throughout the control system as discussed in greater detail below, $C_{loss}$, the additional loss component is significantly reduced. Thus, energy/revenue associated with the lost production is negated.

According to an alternative embodiment of the present disclosure, the capacity factor may be determined based on whether or not the inverter remains in communication with the compensation system 400. If the inverter is no longer in communication with the compensation system 400, then the previous reading for the inverter is used. The previous reading may be the reading before the inverter is no longer in communication with the compensation system 400. According to the alternative embodiment of the present disclosure, the capacity factor may also be determined in equation (3) which provides the following:

$$\text{Capacity Factor} = ((\text{ON Inverters/Communicating Inverters})*(\text{Rated Capacity}) + \Sigma(\text{Not Communicating Inverters Most Recent Output Power Measurement Value}))/(\text{Total Number of Inverters})*(\text{Rated Capacity}) \quad (3)$$

After calculating the capacity factor for the ON inverters using equation 1 or equation 3 at step 532, method 500 proceeds to step 536, where the compensation system 400, using for example the compensation analysis server 448 and/or the compensation analysis engine 452, calculates an output power measurement value for the ON inverters.

After calculating the output power measurement value for the ON inverters at step 536, method 500 proceeds to step 540, where the compensation system 400, using for example the compensation analysis server 448 and/or the compensation analysis engine 452, calculates an adjusted POI measurement setpoint for the PV power plant which will be referred to as the Setpoint.

After calculating an adjusted POI measurement setpoint for the PV power plant at step 540, method 500 proceeds to step 544, where the compensation system 400, using for example the compensation analysis server 448 and/or the compensation analysis engine 452, assigns the adjusted POI measured setpoint to each of the ON inverters.

After assigning the adjusted POI measured setpoint to each of the ON inverters at step 544, method 500 proceeds to decision step 548, where the compensation analysis server 448 and/or the compensation analysis engine 452 determines whether or not the power reference value for the PV power plant retrieved in step 524 has been reached. If the power reference value for the PV power plant has been reached (YES) in decision step 548, method 500 ends at END operation 552. If the power reference value for the PV power plant has not been reached (NO) in decision step 548, method 500 proceeds to step 556, where the compensation system 400, using for example the compensation analysis server 448 and/or the compensation analysis engine 452, classifies each ON inverter as a TRACKING ON inverter or a NON-TRACKING ON inverter. If the ON inverter is TRACKING, method 500 proceeds to the Delta-P loss process for TRACKING ON inverters which begins at step 560 of FIG. 5B and if the ON inverter is NON-TRACKING, method 500 proceeds to the ramp rate process for NON-TRACKING ON inverters which begins at step 590 of FIG. 5C.

TRACKING ON inverters are defined as ON inverters that operate at the Setpoint. Alternatively, NON-TRACKING ON inverters are defined as ON inverters that are unable to operate within a predetermined threshold and a predetermined period of time of the Setpoint. At any time, an inverter operating within a PV power plant can encounter environmentally caused constraints, causing the potential capacity of the PV power plant to fluctuate. Common factors contributing to the environmentally caused constraints include irradiance, temperature, snow, soiling, etc. The distribution of the impact provided by the environmentally caused constraints does not necessarily impact all ON inverters uniformly or chronologically and thus there is no preconceived priority given or outcome expected from one inverter over another. The Delta-P loss process provides that the ON inverters that are unimpacted by environmentally caused constraints (TRACKING ON inverters) compensate for inverters that are impacted by the environmentally caused constraints (NON-TRACKING ON inverters). This is possible by taking the measurements from sensors 350 at each inverter.

Referring to FIG. 5B, after classifying that an ON inverter is TRACKING at step 556, method 500 proceeds to step 560, where the compensation system 400 retrieves the rated capacity for the TRACKING ON inverters. The rated capacity for the TRACKING ON inverters is retrieved by compensation system 400 from the metadata stored in a database such as data database 412, preferences databased 436 and/or analysis database 456.

After retrieving the rated capacity for the TRACKING ON inverters at step 560, method 500 proceeds to step 564, where the compensation system 400, using for example the compensation analysis server 448 and/or the compensation analysis engine 452, calculates a Delta-P loss for the TRACKING ON inverters. A current control cycle, n, is defined by equation (4) as follows:

$$\text{Delta-}P_n \text{ loss} = \text{Setpoint}_n - \Sigma(\text{Output Power Measurement Value for Each Inverter}_n) \quad (4)$$

After calculating the Delta-P loss for the TRACKING ON inverters at step 564, method 500 proceeds to step 568, where the compensation system 400, using for example the compensation analysis server 448 and/or the compensation analysis engine 452, calculates a deviation percentage from the Delta-P loss. The deviation percentage is calculated in equation (5) as follows:

$$\text{Deviation Percentage}_n = \text{Delta-}P_n \text{ loss/Rated Capacity for the TRACKING ON inverters}_n \quad (5)$$

After calculating the deviation percentage at step 568, method 500 proceeds to step 572, where the compensation system 400, using for example the compensation analysis server 448 and/or the compensation analysis engine 452, adds the deviation percentage to the Setpoint for the TRACKING ON inverters to generate an adjusted setpoint, referred to as the Adjusted Setpoint. The compensation system 400 adds the deviation percentage calculated in step 568 to a new control cycle. According to an embodiment of the present disclosure, the deviation percentage is added to the previous setpoint of the TRACKING ON inverters of the previous control cycle as shown in equation (6) provided below.

$$\text{Adjusted Setpoint}_n = \text{Setpoint}_n + \text{Deviation Percentage}_n \quad (6)$$

In a physical sense, this loss or Delta-P loss is created by disturbances (e.g. variable irradiance, soiling, snow) and can take place rapidly or slowly over time. These disturbances are referred to as losses because their impact incurs a loss in instantaneous power production. When integrated over time these Delta-P losses accumulate into non-negligible losses in energy/revenue if the Delta-P loss is not used.

After adding the deviation percentage to the Setpoint for the TRACKING ON inverters to generate the adjusted setpoint at step 572, method 500 proceeds to step 576, where the compensation system 400, using for example the compensation analysis server 448 and/or the compensation analysis engine 452, applies the adjusted setpoint to the TRACKING ON inverters.

After applying the adjusted setpoint to the TRACKING ON inverters at step 576, method 500 proceeds to decision step 580 where the compensation system 400, using for example the compensation analysis server 448 and/or the compensation analysis engine 452, determines if a TRACKING ON inverter becomes NON-TRACKING. If a TRACKING ON inverter becomes NON-TRACKING (YES) at decision step 580, method 500 proceeds to the ramp rate process for NON-TRACKING ON inverters which begins at step 590 of FIG. 5C.

If a TRACKING ON inverter does not become NON-TRACKING (NO) at decision step 580, method 500 proceeds to decision step 584 where the compensation system 400, using for example the compensation analysis server 448 and/or the compensation analysis engine 452, determines if the TRACKING ON inverter is outputting at the rated capacity. If the TRACKING ON inverter is outputting at the rated capacity (YES) at decision step 584, method 500 returns to step 576, where the compensation system 400, using for example the compensation analysis server 448 and/or the compensation analysis engine 452, applies the adjusted setpoint to the TRACKING ON inverters. If the TRACKING ON inverter is not outputting at the rated capacity (NO) at decision step 584, method 500 proceeds to decision step 588, where the compensation system 400, using for example the compensation analysis server 448 and/or the compensation analysis engine 452 determines if the power reference value for the PV power plant has been reached. If the power reference value for the PV power plant has been reached (YES) at decision step 588, method 500 returns to END operation 552. If the power reference value for the PV power plant has not been reached (NO) at decision step 588, method 500 returns to step 564 where the compensation system 400, using for example the compensation analysis server 448 and/or the compensation analysis engine 452, calculates the Delta-P loss for the TRACKING ON inverters.

According to an embodiment of the present disclosure, the Adjusted Setpoint is distributed among the TRACKING ON inverters. After the Adjusted Setpoint has been calculated, the process is implemented continuously and loops until any one of the following predetermined conditions are met: 1) the TRACKING ON inverters undergo a disturbance and thus are no longer TRACKING and are incorporated within the NON-TRACKING ON inverter group; 2) the TRACKING ON inverters are outputting at their rated capacity; or 3) the power reference value for the PV power plant has been reached. In conventional control systems, Delta-P losses are not considered. With Delta-P losses not being considered, conventional PV power plant controllers artificially de-rate TRACKING ON inverters as the initial power drops at the POI. This rules out complete compensation for traditional controllers that broadcast limits to TRACKING ON inverters based upon POI feedback only. According to embodiments of the present disclosure, by also measuring the output power for each of the ON inverters with the sensors 350 and then classifying each ON inverter as either a TRACKING ON inverter or a NON-TRACKING ON inverter leads to optimized control signals where available. Thus, rather than providing a broadcast signal (i.e., a signal with only one magnitude at a given time), unique control signals can be generated for every inverter at a given time when necessary. Therefore, this eliminates the need to provide a broadcast signal to each inverter indiscreetly.

Now that the capacity factor process and the Delta-P loss process have been accounted for with the TRACKING ON inverters, method 500 proceeds to the ramp rate process which optimizes the recovery of the NON-TRACKING ON inverters as illustrated in FIG. 5C. Referring to FIG. 5C, after classifying that an ON inverter is NON-TRACKING at step 556 in FIG. 5A or determining that a TRACKING ON inverter become a NON-TRACKING ON inverter at step 580 in FIG. 5B, method 500 proceeds to step 590, where the compensation system 400, using for example the compensation analysis server 448 and/or the compensation analysis engine 452, corrects the adjusted POI measured Setpoint for each of the NON-TRACKING ON inverters to generate a Corrected Setpoint. The adjusted POI measured Setpoint for each of the NON-TRACKING ON inverters is corrected by using the retrieved output power measurement value for each of the inverter from step 512 and multiplying it by 1+threshold percent as illustrated in equation (7) below:

$$\text{Corrected Setpoint}_n = \text{Output Power Measurement Value}_{n-1} * (1+\text{Threshold Percent}) \qquad (7)$$

where the threshold percent is a predetermined percentage value.

After the adjusted POI measured Setpoint for each of the NON-TRACKING ON inverters has been corrected at step 590, method 500 proceeds to step 591, where the compensation system 400 retrieves the rated capacity for the NON-TRACKING ON inverters. The rated capacity for the NON-TRACKING ON inverters is retrieved by compensation system 400 from the metadata stored in a database such as data database 412, preferences databased 436 and/or analysis database 456.

After retrieving the rated capacity for the NON-TRACKING ON inverters at step 591, method 500 proceeds to step 592, where the compensation system 400, using for example the compensation analysis server 448 and/or the compensation analysis engine 452, calculates a rate limited setpoint increase for the NON-TRACKING ON inverters. The rate limited setpoint increase is a derived value which is dependent on the sum of the capacities of the NON-TRACKING ON inverters. The value is inversely proportional to the number of NON-TRACKING ON inverters. This inverse relationship ensures that the rate of recovery for the NON-TRACKING ON inverters is optimized to recover as quickly as possible without violating the POI rate limit. Therefore, as the number of NON-TRACKING ON inverters gets smaller, the rated rate limited setpoint increase gets larger. This is achieved conceptually as provided in equation (8):

$$\text{Rate Limited Setpoint Increase}_n = \text{Constant Rate Limited Setpoint Increase}/(\text{Rated Capacity of NON-TRACKING ON inverters})_n. \qquad (8)$$

Therefore, the Corrected Setpoint for the NON-TRACKING ON inverters for the next control cycles results in equation (9) which provides the following:

$$\text{Corrected Setpoint}_{n+1} = \text{Corrected Setpoint}_n + \text{Rate Limited Setpoint Increase}_n \qquad (9)$$

According to an alternative embodiment of the present disclosure, the rate limited setpoint increase is calculated not only based on the capacity of NON-TRACKING ON inverters as discussed above, but also includes a dynamic rate limited setpoint increase component which is discussed in greater detail below. Equation (10) provides the rate limited setpoint increase based on the dynamic rate limited setpoint increase component as follows:

Rate Limited Setpoint Increase$_n$=(Constant Rate Limited Setpoint Increase+Dynamic Rate Limited Setpoint Increase)/(Rated Capacity of NON-TRACKING ON inverters)$_n$ (10)

The dynamic rate limited setpoint increase is calculated from measurements, taken from the POI meter 353. For example, two samples, separated by T seconds, are taken from the meter 353. The difference between the two samples is computed, resulting in the measurement of Delta-P-T. Delta-P-T is the POI ramp rate over the period T, measured in the units %/T seconds. Next, the POI ramp rate Delta-P-T is compared to an Ideal Delta-P-T which may be stored for example in metadata. The difference between Ideal Delta-P-T and POI ramp rate Delta-P-T is the dynamic rate limited setpoint increase. This optimization allows NON-TRACKING ON inverters that have resources (e.g. irradiance) to compensate for NON-TRACKING ON inverters without resources. The NON-TRACKING ON inverters with resources, which cannot otherwise compensate via the Delta-P loss because they are NON-TRACKING ON inverters, can now contribute more to optimizing energy harvest from the PV power plant.

The value of the rate limited setpoint increase using either equation (8) or equation (10) is optimized continuously based on the number of NON-TRACKING ON inverters.

After calculating the rate limited setpoint increase for the NON-TRACKING ON inverters at step 592, method 500 proceeds to step 595, where the compensation system 400, using for example the compensation analysis server 448 and/or the compensation analysis engine 452, adds the calculated rate limited setpoint increase to the previous setpoint to obtain an increased setpoint.

After the increased setpoint has been obtained at step 595, method 500 proceeds to step 596, where the compensation system 400, using for example the compensation analysis server 448 and/or the compensation analysis engine 452, applies the increased setpoint to the NON-TRACKING ON inverters.

After applying the increased setpoint to the NON-TRACKING ON inverters at step 596, method 500 proceeds to decision step 597, where the compensation system 400, using for example the compensation analysis server 448 and/or the compensation analysis engine 452, determines if a NON-TRACKING ON inverter starts tracking at the adjusted setpoint as the TRACKING ON inverters. Due to the rate limited setpoint increase, the NON-TRACKING ON inverters are now tracking within a predetermined range of the TRACKING ON inverters and become TRACKING ON inverters.

If a NON-TRACKING ON inverter starts tracking (YES) at decision step 597, method 500 proceeds to the Delta-P loss process for TRACKING ON inverters which begins at step 560 of FIG. 5B. If a NON-TRACKING ON inverter does not start tracking (NO) at decision step 597, method 500 proceeds to decision step 598, where the compensation system 400, using for example the compensation analysis server 448 and/or the compensation analysis engine 452, determines if the NON-TRACKING ON inverter experiences a disturbance. If the NON-TRACKING ON inverter experiences a disturbance (YES) at decision step 598, method 500 returns to step 590, where the compensation system 400, using for example the compensation analysis server 448 and/or the compensation analysis engine 452, corrects the adjusted POI measured setpoint for each of the NON-TRACKING ON inverters. If there is no disturbance with the NON-TRACKING ON inverter (NO) at decision step 598, method 500 proceeds to decision step 599, where the compensation system 400, using for example the compensation analysis server 448 and/or the compensation analysis engine 452, determines if the power reference value for the PV power plant has been reached. If the power reference value for the PV power plant has been reached (YES) at decision step 599, method 500 returns to END operation 552. If the power reference value for the PV power plant has not been reached (NO) at decision step 599, method 500 returns to step 591 where the compensation system 400 retrieves the rated capacity for the NON-TRACKING ON inverters.

According to an embodiment of the present disclosure, the value of the rate limited setpoint increase is optimized continuously based on the number of NON-TRACKING ON inverters. The NON-TRACKING ON inverters increase their power output so they become TRACKING ON inverters. Therefore, a recovery setpoint is continuously increased by the rate limited increase amount. Method 500 continues where the process is implemented continuously and loops until any one of the following predetermined conditions are met: (1) the output of NON-TRACKING ON inverters has increased sufficiently and is within a predetermined percentage magnitude for a predetermined amount of time, thus, the classification of the NON-TRACKING ON inverter(s) moves from NON-TRACKING to TRACKING; (2) the NON-TRACKING ON inverters undergo a new environmental constraint which results in a new Delta-P loss such that the NON-TRACKING ON inverter retains its NON-TRACKING classification and begins the sequence of correction of the setpoint; or (3) the power reference value for the PV power plant has been reached.

Figure 6:
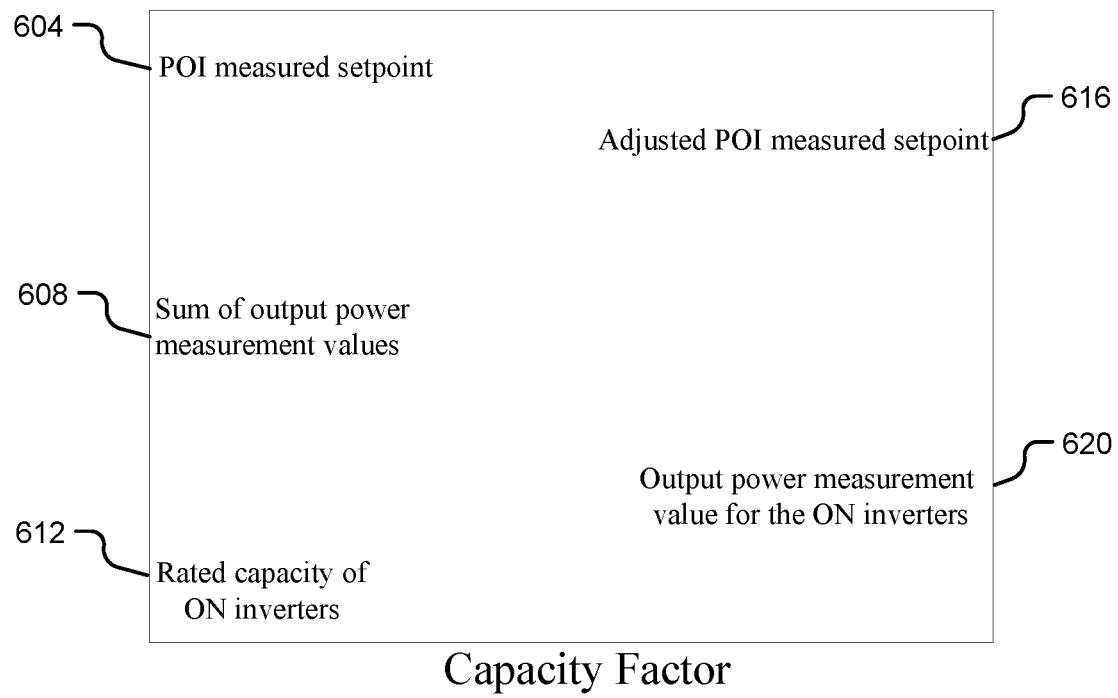
FIG. 6 is a block diagram of an embodiment of a capacity factor module according to the present disclosure.

FIG. 6 is a block diagram of an embodiment of a capacity factor module 600 according to the present disclosure. As described above, modules may be a computer readable medium with functionality associated with a particular task. The capacity factor module 600 according to the present disclosure includes three inputs and two outputs. The three inputs include a POI measured setpoint input 604 (the POI measured setpoint for the PV power plant as discussed above in step 528), a sum of the outpower measurement values input 608 (the sum of the power measurement values for each inverter as discussed above in step 512) and the rated capacity of the ON inverters input 612 (the numerator in equation 1 as discussed above). The two outputs include an adjusted POI measured setpoint output 616 (the adjusted POI measured setpoint for the PV power plant discussed above in step 540) and an output power measurement value for ON inverters output 620 (the output power measurement value for the ON inverters as discussed above in step 536). Using the data signals on the inputs and referencing internal data from preferences and performance thresholds, the capacity factor module 600 computes the respective outputs.

The following example provides an explanation for determining the capacity factor for the ON inverters and the output power measurement value for the ON inverters using capacity factor module 600.

1. Assume the total number of inverters is 10
2. Assume the number of ON inverters is 8
3. Assume each inverter of the total number of inverters has a rated capacity of 100

4. This means that the total rated capacity=1000 (100*10) and rated capacity for the ON inverter=800 (100*8)
5. Therefore, the capacity factor for the ON inverters= (8*100)/(10*100)=0.8 (by using equation 1 above)
6. Now assume that the POI output measurement value for the PV power plant is 50% of total rated capacity
7. Since there are only 8 ON inverters, the output power measurement value for the ON inverters)=50%/capacity factor=50%/0.8=62.5%

The system produces 50% of the total rated power with only 80% or 8 out of 10 of the ON inverters. Therefore, the ON inverters aren't producing at 50%, they are actually producing at 62.5%.

Figure 7:
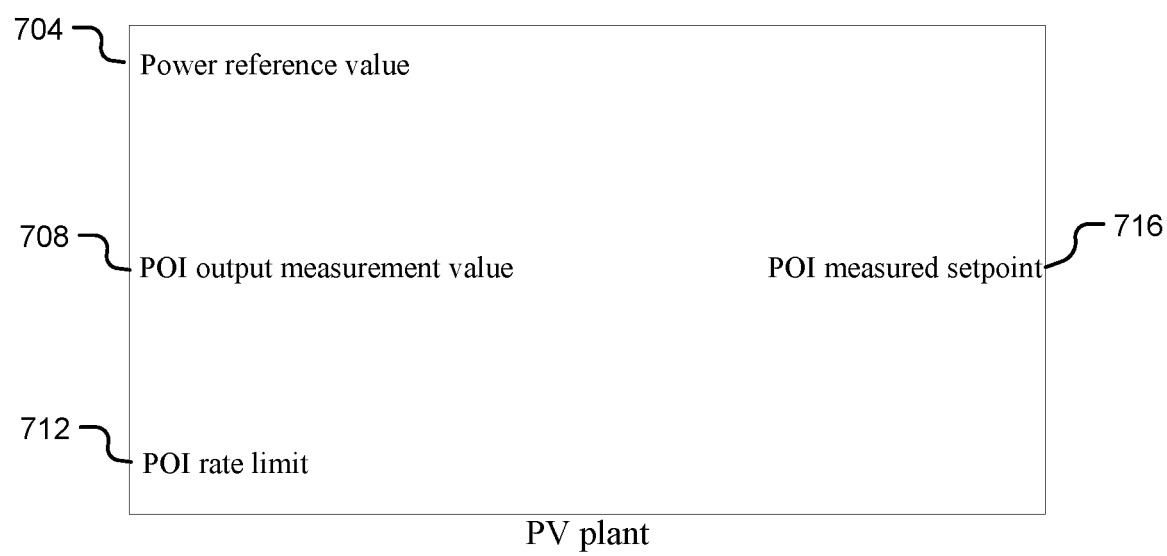
FIG. 7 is a block diagram of an embodiment of a PV plant module according to the present disclosure.

FIG. 7 is a block diagram of an embodiment of a PV plant module 700 according to the present disclosure. The PV plant module 700 includes three inputs and one output. The three inputs include a power reference value input 704 (the power reference value of the PV power plant discussed above in step 524), a POI output measurement value input 708 (the POI output measurement value for the PV power plant discussed above in step 520), and a POI rate limit input 712 (the maximum increase or decrease in power per unit time allowed at the POI). The single output includes a POI measured setpoint output 716 (the POI measured setpoint for the PV power plant as discussed above in step 528). Using the data signals on the inputs and referencing internal data from preferences and performance thresholds, the PV plant module 700 computes the single output 716

Figure 8:
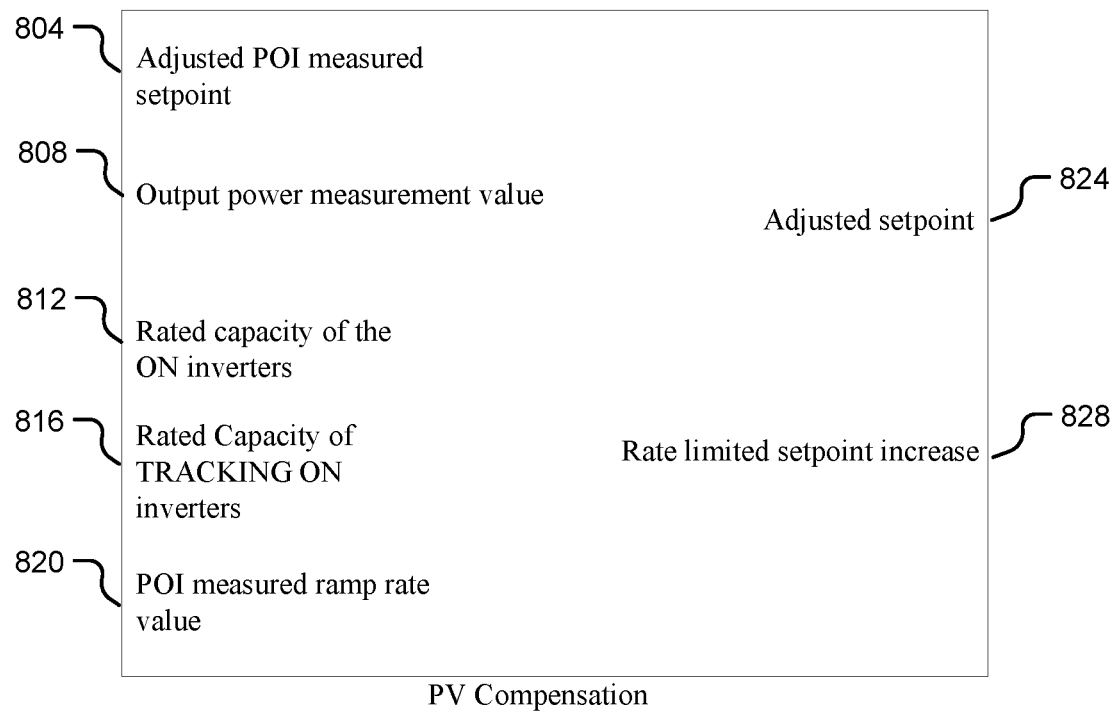
FIG. 8 is a block diagram of an embodiment of a PV compensation module according to the present disclosure.

FIG. 8 is a block diagram of an embodiment of a PV compensation module 800 according to the present disclosure. The PV compensation module 800 according to the present disclosure includes five inputs and two outputs. The five inputs include an adjusted POI measured setpoint input 804 (the adjusted POI measured setpoint for the PV power plant discussed above in step 540), an input 808 for the output power measurement value (the output power measurement value for the ON inverters as discussed above in step 536), a rated capacity of the ON inverters input 812 (the numerator in equation 1 as discussed above), a rate capacity of TRACKING ON inverters input 816 (the rated capacity for the TRACKING ON inverters as discussed above in step 560) and a POI measurement ramp rate value input 820 (the POI measured ramp rate value as discussed above in step 592). The two outputs include an adjusted setpoint output 824 (the adjusted setpoint applied to the TRACKING ON inverter as discussed in step 576) and a rate limited setpoint increase output 828 (the rate limited setpoint increase as discussed in step 592). Using the data signals on the inputs and referencing internal data from preferences and performance thresholds, the PV compensation module 800 computes the respective outputs.

Figure 9:
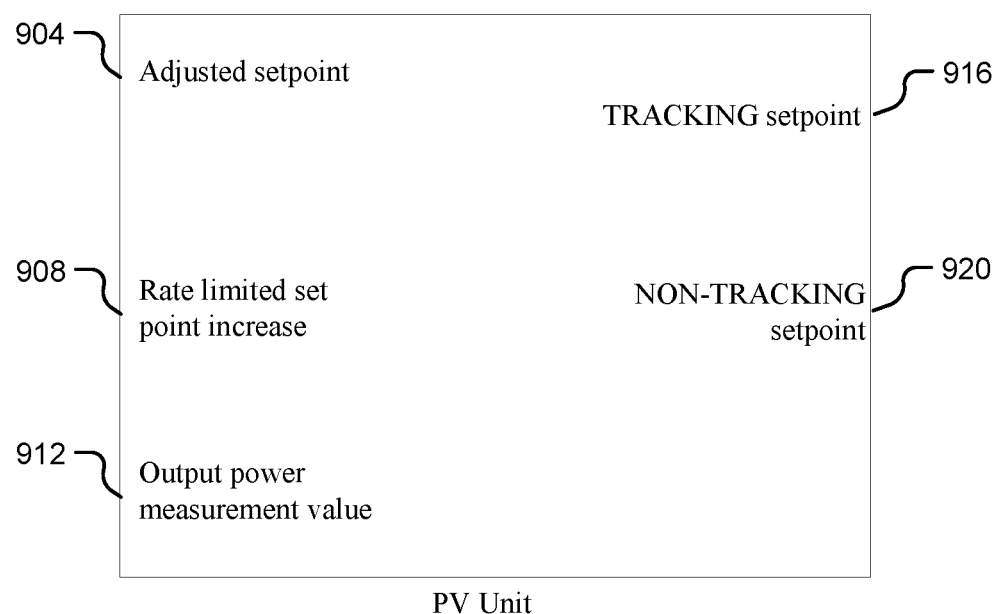
FIG. 9 is a block diagram of an embodiment of a PV unit module according to the present disclosure.

FIG. 9 is a block diagram of an embodiment of a PV unit module 900 according to the present disclosure. The PV unit module 900 according to the present disclosure includes three inputs and two outputs. The three inputs include an input 904 for the adjusted setpoint applied to the TRACKING ON inverters (the adjusted setpoint applied to the TRACKING ON inverters as discussed above in step 576), a rate limited setpoint input 908 (the calculated rate limited setpoint increase as discussed above in step 592) and an input 912 for the output power measurement value for each inverter (the output power measurement value for each inverter as discussed above in step 512). The two outputs include a TRACKING setpoint output 916 (as discussed above in step 572) and a NON-TRACKING setpoint output 920 (as discussed above in step 596).

The PV unit module 900 is used to determine whether an ON inverter is a TRACKING ON inverter or a NON-TRACKING ON inverter. If the ON inverter is classified as a TRACKING ON inverter, then the PV unit module 900 at output 916 outputs the value received at 904 which represents the setpoint sent to the TRACKING ON inverter. If the ON inverter is classified as a NON-TRACKING ON inverter the PV unit module 900 at output 920 would either output the corrected setpoint plus the input at 908 which is rate limited setpoint increase or the previous value at input 908 (which is the previous rate limited setpoint increase).

The foregoing discussion has been presented for purposes of illustration and description. The foregoing is not intended to limit the disclosure to the form or forms disclosed herein. In the foregoing Detailed Description for example, various features of the present disclosure are grouped together in one or more aspects, embodiments, and/or configurations for the purpose of streamlining the disclosure. The features of the aspects, embodiments, and/or configurations of the present disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate embodiment of the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

Transmission media used as links, for example, can be any suitable carrier for electrical signals, including coaxial cables, copper wire and fiber optics, and may take the form of acoustic or light waves, such as those generated during radio-wave and infra-red data communications.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

In the foregoing description, for the purposes of illustration, methods were described in a particular order. It should be appreciated that in alternate embodiments, the methods may be performed in a different order than that described, and that changes, additions, and omissions to the order of the methods can occur without materially affecting the operation of the disclosed embodiments, configurations, and aspects of the present disclosure. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Optionally, the systems and methods of this present disclosure can be implemented in conjunction with a special purpose computer, a special purpose data-processing system, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this present disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this present disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Moreover, though the description has included description of one or more aspects, embodiments, and/or configurations and certain variations and modifications, other variations, combinations, and modifications are within the scope of the present disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. While the present disclosure has been discussed with respect to various embodiments, it shall be understood that various other changes and modifications to the present disclosure can be made in accordance with the scope of the claims appended hereto.

What is claimed is:

1. A method of controlling a power plant, comprising:
retrieving a sum of output power measurement values for each inverter of a total number of inverters from a plurality of sensors;
retrieving a point of interconnection (POI) output measurement value for the power plant based on a plurality of ON inverters of the total number of inverters;
receiving a POI measured setpoint for the power plant;
receiving a summation of output power measurement values for the plurality of ON inverters;
classifying each ON inverter of the plurality of ON inverters as either a TRACKING ON inverter or a NON-TRACKING ON inverter based on whether each ON inverter is tracking at a determined setpoint;

adding a deviation percentage to the determined setpoint for the TRACKING ON inverters to generate an adjusted setpoint; and applying the adjusted setpoint to the TRACKING ON inverters until the TRACKING ON inverters are no longer tracking and become NON-TRACKING ON inverters.

2. The method of claim 1, further comprising increasing the determined setpoint in response to detecting the summation of output power measurement values from each of the plurality of ON inverters is less than the determined setpoint.

3. The method of claim 1, wherein the POI output measurement value is retrieved from a meter provided between the power plant and a power grid.

4. The method of claim 3, wherein the meter includes a root mean transmitter, a revenue meter, or protective relays.

5. The method of claim 1, further comprising correcting the determined setpoint for the NON-TRACKING ON inverters and adding a rate limited setpoint increase to the NON-TRACKING ON inverters.

6. The method of claim 5, wherein the rate limited setpoint increase is inversely proportional to a number of NON-TRACKING ON inverters.

7. The method of claim 1, wherein the determined setpoint is based on an amount of energy required from the power plant.

8. The method of claim 1, wherein the deviation percentage is based on a loss value for the TRACKING ON inverters.

9. The method of claim 1, wherein each sensor of the plurality of sensors is provided at a location proximal to each inverter.

10. The method of claim 1, wherein the POI measured setpoint of the power plant is based on a difference between a power reference value for the power plant and the retrieved POI output measurement value for the power plant.

11. The method of claim 10, further comprising:
receiving weather data from multiple locations within the power plant,
wherein the power reference value for the power plant is based in part on the received weather data.

12. A power plant controller, the power plant controller comprising a processor and memory device, the power plant controller configured to:
retrieve a sum of output power measurement values for each inverter of a total number of inverters from a plurality of sensors;
retrieve a point of interconnection (POI) output measurement value for the power plant based on a plurality of ON inverters of the total number of inverters;
receive a POI measured setpoint for the power plant;
receive a summation of output power measurement values for the plurality of ON inverters;
classify each ON inverter of the plurality of ON inverters as either a TRACKING ON inverter or a NON-TRACKING ON inverter based on whether each ON inverter is tracking at a determined setpoint;
add a deviation percentage to the determined setpoint for the TRACKING ON inverters to generate an adjusted setpoint; and
apply the adjusted setpoint to the TRACKING ON inverters until the TRACKING ON inverters are no longer tracking and become NON-TRACKING ON inverters.

13. The power plant controller of claim 12, further configured to increase the determined setpoint in response to detecting the summation of output power measurement values from each of the plurality of ON inverters is less than the determined setpoint.

14. The power plant controller of claim 12, wherein the POI output measurement value is retrieved from a meter provided between the power plant and a power grid.

15. The power plant controller of claim 12, further configured to correct the determined setpoint for the NON-TRACKING ON inverters and add a rate limited setpoint increase to the NON-TRACKING ON inverters.

16. The power plant controller of claim 15, wherein the rate limited setpoint increase is inversely proportional to a number of NON-TRACKING ON inverters.

17. One or more non-transitory computer-readable storage media having computer-executable instructions embodied thereon for controlling a plurality of inverters, wherein when executed by a power plant controller of a power plant, the computer-executable instructions cause the power plant controller to:
retrieve a sum of output power measurement values for each inverter of a total number of inverters from a plurality of sensors;
retrieve a point of interconnection (POI) output measurement value for the power plant based on a plurality of ON inverters of the total number of inverters;
receive a POI measured setpoint for the power plant;
receive a summation of output power measurement values for the plurality of ON inverters;
classify each ON inverter of the plurality of ON inverters as either a TRACKING ON inverter or a NON-TRACKING ON inverter based on whether each ON inverter is tracking at a determined setpoint;
add a deviation percentage to the determined setpoint for the TRACKING ON inverters to generate an adjusted setpoint; and
apply the adjusted setpoint to the TRACKING ON inverters until the TRACKING ON inverters are no longer tracking and become NON-TRACKING ON inverters.

18. The computer-readable storage media of claim 17, wherein the computer-executable instructions also cause the power plant controller to increase the determined setpoint in response to detecting the summation of output power measurement values from each of the plurality of ON inverters is less than the determined setpoint.

19. The computer-readable storage media of claim 17, wherein the POI output measurement value is retrieved from a meter provided between the power plant and a power grid.

20. The computer-readable storage media of claim 17, wherein the computer-executable instructions also cause the power plant controller to correct the determined setpoint for the NON-TRACKING ON inverters and add a rate limited setpoint increase to the NON-TRACKING ON inverters.

* * * * *